United States Patent [19]

Levine et al.

[11] Patent Number: 4,837,731
[45] Date of Patent: Jun. 6, 1989

[54] SYSTEM FOR TIME PROGRAMMING OF STATES BY COMMUNICATING TIME DATA VIA A CONTINUOUSLY ROTATABLE POTENTIOMETER

[75] Inventors: Matthew Levine; Anthony Cairo; James Russo; Victor Rigotti; Roger Clark, all of Ann Arbor, Mich.

[73] Assignee: Honeywell Incorporated, Minneapolis, Minn.

[21] Appl. No.: 70,799

[22] Filed: Jul. 7, 1987

[51] Int. Cl.⁴ .............. F23N 5/20; G05D 23/19; G04C 9/00; G04B 27/00
[52] U.S. Cl. .................... 364/145; 165/12; 236/46 R; 236/94; 368/187
[58] Field of Search ............ 340/309.15; 364/145; 165/12; 236/46 R, 47, 94; 368/73, 74, 187

[56] References Cited

U.S. PATENT DOCUMENTS

| | | | |
|---|---|---|---|
| 4,193,120 | 3/1980 | Yello | 364/145 |
| 4,203,074 | 5/1980 | Gass | 308/181 |
| 4,246,650 | 1/1981 | Moritani et al. | 368/69 |
| 4,335,847 | 6/1982 | Levine | 236/46 R |
| 4,449,832 | 5/1984 | Kammerer | 368/187 |
| 4,459,031 | 7/1984 | Perucchi | 368/74 X |
| 4,481,604 | 11/1984 | Gilham et al. | 364/900 |
| 4,621,336 | 11/1986 | Brown | 236/46 R |
| 4,730,941 | 3/1988 | Levine et al. | 236/94 X |
| 4,751,961 | 6/1988 | Levine et al. | 236/94 X |

FOREIGN PATENT DOCUMENTS 0067244 5/1980 Japan .
0201557 9/1986 Japan .

OTHER PUBLICATIONS

GE VCR Manual for Model 1VCR6002X, pub. no. (VQTS0796) 29-9902-85, 1985, 15-17.

Primary Examiner—Clark A. Jablon
Attorney, Agent, or Firm—Krass & Young

[57] ABSTRACT

The present invention is a technique for operator entry of a time program into a programmable device. An operator adjustable input device having associated time indicia is employed to enter a time signal indicative of a time a selected time. A manual control state input device enables selection of one a control state. When the programmable device is in a program mode the selected control state is stored in a program memory at a location corresponding to the selected time. This program memory stores a program of control states for particular times. When in a control mode a clock signal indicative of the current time permits recall of the control state for the current time, thus permitting control in accordance with the recalled control state. In accordance with the preferred embodiment the programmable device is an electronic thermostat. The operator adjustable input device enables input of the times for storage of temperature offsets in the program mode and enables input of a set point temperature in the control mode. The thermostat control function seeks to maintain the temperature at the sum of the set point temperature and the temperature offset for the current time.

21 Claims, 3 Drawing Sheets

SYSTEM FOR TIME PROGRAMMING OF STATES BY COMMUNICATING TIME DATA VIA A CONTINUOUSLY ROTATABLE POTENTIOMETER

FIELD OF THE INVENTION

The field of the present invention is that of programmable devices, such as microprocessors, and in particular the input technique used to program such devices.

BACKGROUND OF THE INVENTION

It is known in the art of microprocessor devices to provide a programmable control function. Such programmable microprocessor devices are employed in electronic thermostats. The typical electronic thermostat permits the user to enter a program of a set of desired temperatures for particular times of a repetitive time period such as a day or a week. Once this time-/temperature program is entered the electronic thermostat controls the heater and/or the air conditioner to achieve the desired temperature at the desired time.

The typical electronic thermostat employs a keyboard of one or more momentary contact push buttons as an input device and a liquid crystal display as an output device. In accordance with the prior art the user operates the keys of the keyboard to input the program of desired temperatures for desired times and receives feedback regarding the program specification process via the liquid crystal display. In accordance with the typical prior art electronic thermostat the user enters a digital representation of the desired time and the desired temperature via a keyboard with the ten digits 0-9. The display will show the entered quantity also in digital form. Typically the operator is also permitted to review the time/temperature program stored in the electronic thermostat via the liquid crystal display by proper manipulation of the keyboard.

This technique known in the prior art is not without problems. Firstly, such electronic thermostats are often used by persons unsophisticated in the computer arts and therefore not familiar with the process of program entry. Most people are more familiar with analog representations of time and temperature than with the digital representations required by the prior art. Thus the type of input required and the type of output provided may be confusing to the user. Secondly, the provision of a keyboard and a liquid crystal display in such an electronic thermostat is an added expense that should be avoided if possible.

Thus it would be advantageous to be able to provide a technique for specification of a program of desired control states at desired times which provides analog representation of time input, which permits review of the program and which is less expensive in manufacture than the typical keyboard and LCD combination of the prior art.

SUMMARY OF THE INVENTION

This invention employs an operator controllable rotary potentiometer for time programming a control device such as a programmable electronic thermostat. Prior programmable electronic thermostats employed an LCD time display for indicating time used in specifying a program and a plurality of keys forming a keyboard for programming the device with desired temperatures for desired times.

In accordance with the present invention, programming of the device takes place as follows. A rotary potentiometer has an indicator can be associated with a printed indicia of time from midnight through noon to the next midnight through operator rotation of the potentiometer. The operator rotates the potentiometer indicator to be opposite the desired time on the printed indicia. The operator then enters the desired state for that time. In accordance with the preferred embodiment that desired state is the amount of temperature offset. The microprocessor detects the potentiometer setting to determine the specified time and then stores the desired state for that time in a memory. As in the prior art a real time clock enables the microprocessor to recall the desired state for the current time and provides the control to that desired state.

This same potentiometer can be used to review a program already stored in the memory. The position of the potentiometer indicates the time. The microprocessor converts the potentiometer setting into an address for recalling from the memory the stored state for that time. The plurality of possible states could be indicated by the activation of one or more LCD's or LED's. The potentiometer setting causes the microprocessor to recall the state stored in the memory associated with the time indicated by the potentiometer setting.

The same potentiometer can be used to set the clock. This is achieved by the operator turning the indicator to be opposite the indicia corresponding to the current time and then operating a time set push control. The microprocessor then reads the time indicated by the potentiometer setting and sets the real time clock accordingly. In accordance with the preferred embodiment of the present invention the microprocessor memory is cleared upon operation of this time set control.

An additional feature that can be advantageously used with this invention is a day indicating wheel coupled to the rotaty potentiometer. Rotation of the potentiometer through midnight causes the day indicating wheel to turn to the next day or the previous day depending on the direction of motion. The microprocessor detects the rotation of the potentiometer through midnight and similarly changes the day specified by the real time clock based upon the direction of motion. When this technique is used in conjunction with the above setting of the real time clock there is no need for any connection between the day indicating wheel and the microprocessor.

When used in a thermostat the potentiometer of the invention can also be used for specification of the set point temperature. It is proposed to provide a second indicia for temperature which can be used alternatively with the time indicia. This could be achieved with a door having a hole for access to the knob of the potentiometer. The door is closed for specification of setpoint temperature with corresponding temperature indicia on the door. When the door is open the time indicia is revealed. A door open switch can signal the microprocessor the meaning of the potentiometer setting.

BRIEF DESCRIPTION OF THE DRAWINGS

These and other aspects of the present invention will become clear from study of the drawings in which.

DETAILED DESCRIPTION OF THE PREFERRED EMBODIMENT

Figure 1:
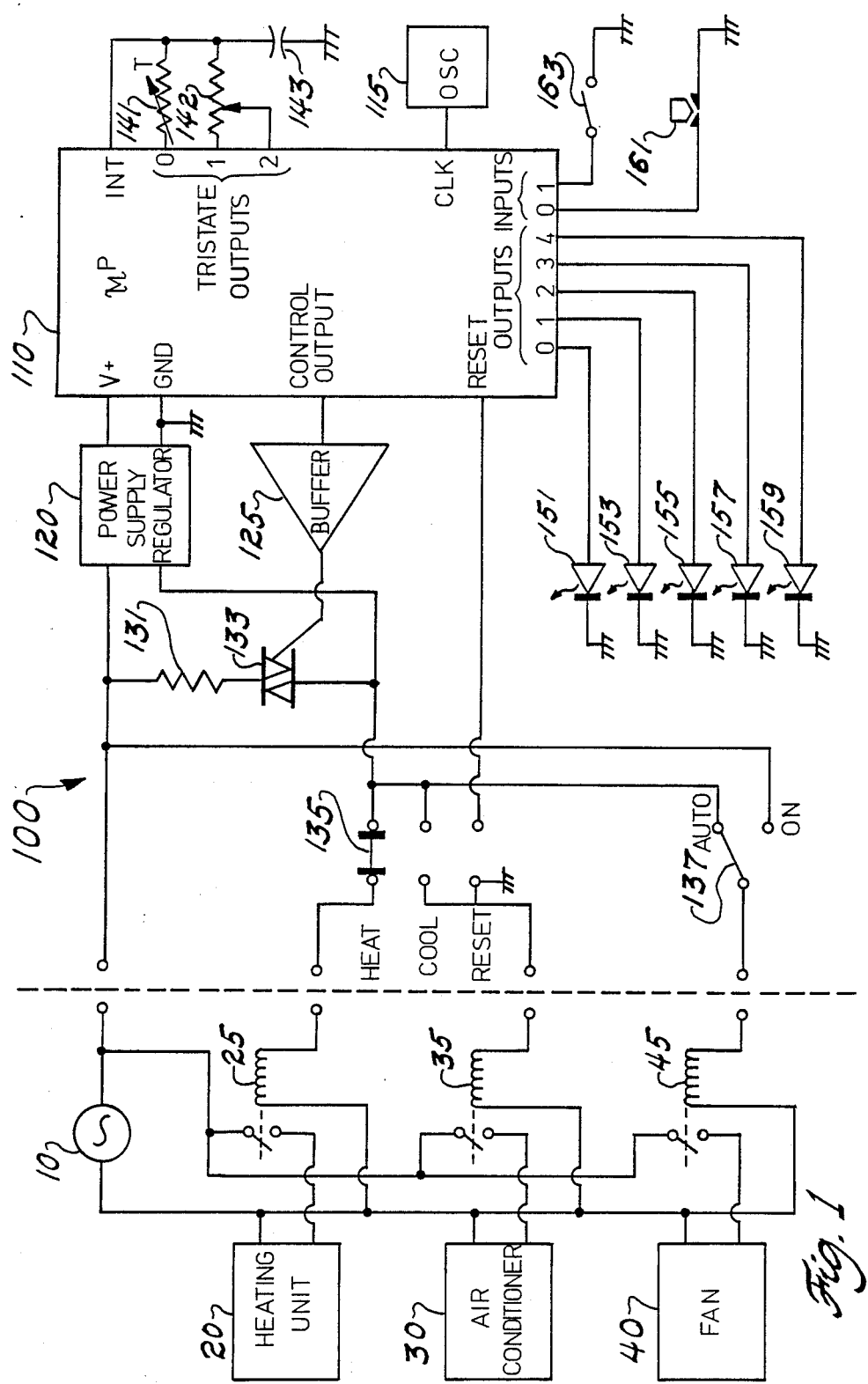
FIG. 1 illustrates an example of an electronic thermostat employing a microprocessor in accordance with the present invention.

FIG. 1 illustrates the construction of an electronic programmable thermostat in accordance with the present invention. Electronic programmable thermostat 100 includes microprocessor unit 110 which is coupled to power supply regulator 120, a buffer 125 which drives a triac 133, a series resistor 131, a heat/cool/reset mode switch 135, a sensing circuit including thermistor 141, potentiometer 142 and capacitor 143, a plurality of light emitting diodes 151, 153, 155 157 and 159, and a pair of switches 161 and 163. Electronic thermostat 100 is connected to a combined heating and air conditioning plant including AC power supply 10, heating unit 20 with an associated relay 25, air conditioner 30 with associated relay 35 and fan 40 with associated relay 45.

Electronic thermostat 100 is programmed via potentiometer 142 and switches 161 and 163 to store a sequence of desired temperatures at desired times. The ambient temperature of the thermostat is measured via thermistor 141. In accordance with the relationship with the measured temperature to the desired temperature, microprocessor unit 110 generates a control output to buffer 125 which controls whether triac 133 is triggered ON or not. If triac 133 is triggered ON then one of the relays 25 or 35 is supplied with electric power from AC source 10 depending upon the state of heat/cool mode switch 135. Relay 45 may be continuously powered or switched with the selected relay 25 or 35 depending upon the position of fan auto/on switch 137. The actuated relay in turn operates the corresponding heating unit 20 or air conditioner 30.

Power supply regulator 120 is connected to receive power from the series connection of resistor 131 and triac 133. This power comes from AC power source 10. In the event that triac 133 is not triggered ON, then the full voltage of the AC power source 10 appears across the input to power supply regulator 120. If, on the other hand, triac 133 is triggered ON, then the voltage input to power supply regulator 120 is the voltage across triac 133 together with the IR voltage appearing across resistor 131. As a result, the input voltage applied to power supply regulator 120 varies widely depending on whether or not triac 133 is triggered ON. Therefore, power supply regulator 120 is employed to smooth these wide variations in supply voltage to derive the appropriate voltage for driving the microprocessor unit 110.

The ambient temperature is measured by the microprocessor unit 110 from the thermistor 141, and capacitor 143. Thermistor 141 together with capacitor 143 forms a RC time constant circuit. The resistance of thermistor 141 varies as a function of ambient temperature. This resistance is measured by measuring the time constant of this RC circuit. Microprocessor unit 110 includes a plurality of tristate output lines 0-2. One of these tristate output lines is applied to one end of the RC time constant circuit, while the other end of this RC time constant circuit is connected to ground.

These tristate output lines of microprocessor unit 110 have unique characteristics. The output of each of these tristate output lines can be driven to the power supply voltage in response to a "1" output or to the ground voltage in response to a "0" output. In this state the output line is connected through a relatively small resistance of 50 to 100 ohms to the respective voltage source. It is also possible to drive any of these tristate output lines to an indeterminate state in which the output line is connected to neither the positive supply voltage or ground. Typically, the isolation between the output and either the power supply voltage or ground is greater than 5 megaohms when in the indeterminate state.

Tristate outputs 0-2 are employed to discharge any charge which is stored on capacitor 143. In response to a "0" output on one or more of tristate outputs 0-2 from microprocessor unit 110 the charge stored in capacitor is discharged 143. This discharge path must be maintained for a sufficient period of time to insure that capacitor 143 is fully discharged.

Lastly, the output voltage across capacitor 143 is connected to an interrupt input of microprocessor unit 110. This interrupt input is triggered when a predetermined voltage is reached at this input. This interrupt input is employed to signal microprocessor unit 110 that the voltage across capacitor 143 has exceeded this predetermined value.

During operation of electronic thermostat 100, the temperature indicated by thermistor 141 is measured employing a program stored within microprocessor unit 110 to control the output supplied to this measurement circuit. Firstly, any charge stored in capacitor 143 is discharged. During this operation one of more the tristate outputs 0-2 are held ground through the output of a digital "0". After a sufficient period to substantially discharge capacitor 143, the tristate outputs 0-2 are set to the indeterminate state.

The time constant of the RC circuit is then measured. The tristate output line 0 is driven to the power supply voltage via the output of a digital "1". At the same time a timer circuit is initialized and begins to accumulate the elapsed time. This output from the tristate output line 0 causes the power supply voltage to be applied across thermistor 141 and capacitor 143. As a consequence, a current flows through this RC circuit and begins accumulate charge within capacitor 143. This accumulating charge within capacitor 143 causes the voltage thereacross to increase. This voltage is sensed by the interrupt input INT of microprocessor unit 110. When the voltage across capacitor 143 exceeds the predetermined threshold of interrupt input INT, this input is triggered. Microprocessor unit 110 is programmed to stop the elapsed time clock at this time. As a consequence, the time then indicated by the elapsed time clock is a measure of the time constant of the RC circuit. Ideally, the only variable in this time constant measurement is the resistance of thermistor 141. Therefore, this measured elapsed time is a measure of the temperature sensed by thermistor 141. Typically, microprocessor unit 110 includes a look-up table to convert this time to the corresponding temperature.

Figure 2:
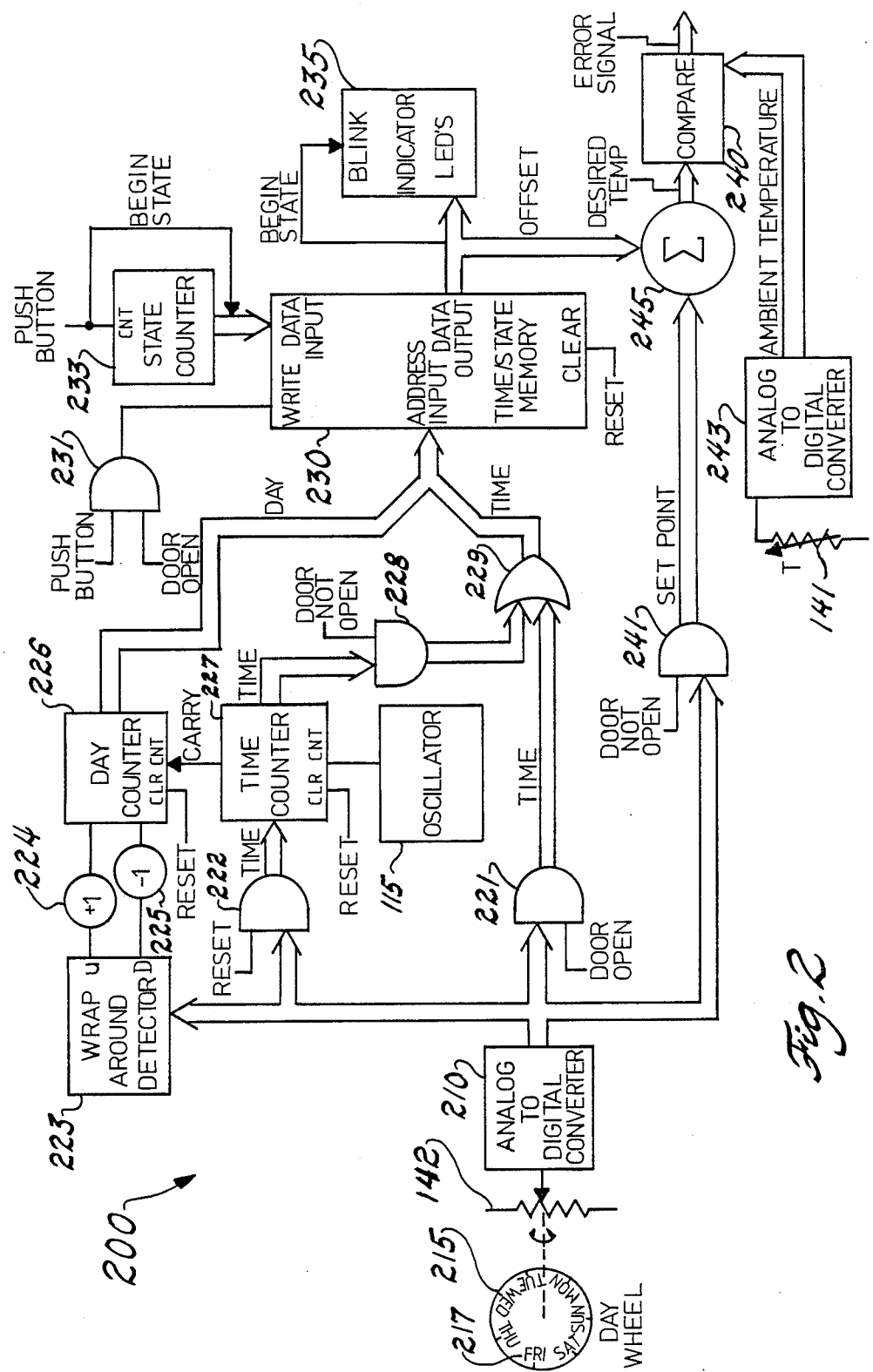
FIG. 2 illustrates the equivalent block diagram of the manner of operation of the present invention.

FIG. 2 illustrates the equivalent logic circuit of the present invention. If the invention is embodied in the programmed microprocessor illustrated in FIG. 1 the program in this microprocessor corresponds to the equivalent logic circuit shown in FIG. 2. Logic circuit 200 receives the input signals from the thermistor 141, the operator set point potentiometer 142, the push-button switch 161 and the door switch 163. This logic circuit 200 generates an error signal which is employed in the control algorithm for control of heating unit 20, air conditioner 30 and fan 40 via triac 133. Because the control algorithm forms no part of the present invention this will not be further described and is not illustrated in the equivalent circuit 200 of FIG. 2.

The operator set point potentiometer 142 is coupled to analog to digital converter 210. Analog to digital converter 210 generates a digital signal which is representative of the selected operator set point of operator set point potentiometer 142. FIG. 2 also illustrates that operator set point potentiometer 142 is mechanically coupled to day wheel 215. In a manner that will be more fully disclosed below, rotation of potentiometer 142 through a complete cycle advances day wheel 215 to expose the next day of day indicia 217.

The logic circuits 221 through 229 together with oscillator 115 serve to generate an address for application to the address input of time/state memory 230. Time/state memory 230 receives a write signal from AND gate 231. Time/state memory 230 also receives a data input signal from state counter 233. Time/state memory 230 generates a data output signal for application to the indicator light emitting diodes 235 and the summing unit 245.

The digital output from analog to digital converter 210 is applied to AND gate 221 where it is gated by the door open signal. The door open signal is generated by reference to the position of door switch 163. When the door switch 163 indicates the door is open then the signal door open is active. The output of AND gate 221 is labeled time and is applied to one input of OR gate 229. The other input of OR gate 229 comes from AND gate 228. A real time clock is formed with oscillator 115, time counter 227 and day counter 226. The output of oscillator 115 is applied to the count input of time counter 227. Time counter 227 generates a signal indicative of the time of day, this time signal being applied to one input of AND gate 228. This time signal is gated via a door not open signal. The door not open signal is the opposite sense of the door open signal and is generated when door switch 163 indicates that the door is not open. Because of the arrangement of AND gates 221 and 228 and OR gate 229, the time signal applied to the address input of time/state memory 230 is either the time signal from analog to digital converter 210 or the time signal from time counter 227.

A day signal from counter 226 is required to form the address input to time/state memory 230. Day counter 226 has its count input attached to the carry output of time counter 227. Thus when time counter 227 overflows, indicating the passage of one day of time, a signal is applied to day counter 226 to count this event. Thus day counter 226 includes a count of the number of days recorded by time counter 227. In accordance with the preferred embodiment of the present invention day counter 226 counts up to seven and then overflows and restarts. This enables day counter 226 to generate a day signal corresponding to each day of the week. The address input applied to time/state memory 230 includes a combination of the information of this day signal and the selected time signal.

Logic circuit 200 illustrates another manner in which the day signal generated by day counter 226 may be altered. Wrap around detector 223 is connected to receive the digital output of analog to digital converter 210. Wrap around detector 223 detects when the digital signal indicative of the potentiometer set point abruptly changes from low to high or from high to low. This corresponds to rotation of the potentiometer through the end point. This results in an abrupt change of the resistance from near 0 to near the maximum if the rotation is in one direction and from near the maximum to near 0 if the rotation is in the opposite direction. Wrap around detector 223 determines whether such an event occurs and if so in which direction.

Wrap around detector 223 indicates rotation past the end point in a first direction upon detection of a slow increase in the resistance of potentiometer 143 followed by rapid decrease in resistance. Rotation past the end point in the opposite direction is indicated by wrap around detector 223 upon detection of a slow decrease in the resistance of potentiometer 143 followed by a rapid increase in resistance. An up output is applied to plus one circuit 224 if the rotation indicates an increase to the next day. Plus one circuit 224 adds one to day counter 226 to increase this count to represent the next day. Similarly, a down output from wrap around detector 223 is applied to minus one circuit 225. Minus one circuit 225 subtracts one from the count of day counter 226 when wrap around detector 223 detects a change in set point potentiometer 142 indicative of backing up one day. Thus day counter 226 keeps a day count which corresponds generally to the visible day of day indicator 217 of day wheel 215.

The time count within time counter 227 may be set from the state of operator set point potentiometer 142. The digital output of analog to digital converter 210 is applied to AND gate 222. A reset signal which comes from one position of slide switch 135 is applied to the other input of AND gate 222. When the reset signal is active, that is when the slide switch 135 is in the reset position, then the digital output of analog to digital converter 210 is coupled to time counter 227 to load the corresponding data into time counter 227.

During programming of the time/state memory 230 the door is open therefore the digital data from analog to digital converter 210 specifies the time in the address input applied to time/state memory 230. Operation of the push-button causes the state counter 233 to cycle between a plurality of states. When the door is open and the push-button is actuated, AND gate 231 applies a signal to the write input of time/state memory 230. This has the effect of storing the current state of state counter 233 in time/state memory 230 at an address corresponding to the time and day input to the address input.

FIG. 2 further illustrates the application of a begin state signal to the data input of time/state memory 230. This is shown as the same signal as the push button signal. In accordance with the present invention, storage of a desired control state selected by state counter 233 at a time specified by the time signal from potentiometer 142 stores this control state for following times as well. Time/state memory 230 will store this control state for all following times until the next specified time/state combination entered into the memory. When the desired control state for the desired time is stored in time/state memory 230, an additional bit corresponding to the begin state bit is also stored for the specified time only. This additional bit serves to mark the beginning of specified state. This beginning marker is employed in a manner that will be described below in relation to the errasure of selected portions of time/state memory 230.

Data is read out of time/state memory 230 at all times. When the door is closed the data read out corresponds to the desired control state for the current time. When the door is open the data read out corresponds to the desired control state for the time signal specified by potentiometer 142. This function can be used to determine the state of state counter 233 when writing into time/state memory 233 or to review the program stored in the memory. At the same time this data is output to the indicator LED's 235 so that the user can be informed of the state recalled from time/state memory 233 through the illumination of one of light emitting diodes 151, 153, 155, 157 or 159. The blink function will be further described below in relation to the erase operation.

When the door is closed the output of analog to digital converter 210 corresponds to the set point temperatures. This output is applied to AND gate 241. The other input to AND gate 241 is the door not open signal. The address applied to the address input of time/state memory 230 is the day from the day counter 226 and the time from time counter 228. Because the door is not open AND gate 231 does not produce a write signal to time/state memory 230. Therefore the address applied to the address input of time/state memory 230 serves to recall from the memory the data stored at the specified address. In accordance with the preferred embodiment of the present invention this data is the temperature offset from an operator set point. The summation unit 245 serves to digitally add the set point data received from AND gate 241 and the offset data received from time/state memory 230. This digital sum corresponds to the desired temperature. This desired temperature is entered into one input of a compare unit 240. The other input to compare unit 240 is a digital signals indicative of the ambient temperature. The resistance of thermistor 141 is measured and this analog measure is applied to analog to digital converter 243. The output of analog to digital converter 243 is the ambient temperature signal which is supplied to compare unit 240. The output of compare unit 240 is the error signal which serves to drive the control system. As discussed above, the control system is not a part of the present invention and will not be further described.

The erase operation will now be described. As noted above time/state memory 230 stores an indication of the beginning time of a new control state. This indication is recalled from time/state memory 230 along with data indicating the control state. This begin state signal is applied to a blink input of indicator LED's 235. When potentiometer 142 is turned to indicate the time of such a beginning of a new control state, the recalled begin state signal triggers indicator LED's to a blinking state. Regardless of the control state indicated, the selected light emitting diode blinks. This blinking indicator informs the user that the time signal equals the beginning of a new control state. This stored indication of state and time can now be errased. This is achieved by operating state counter 233 to the control state for the prior period of time. The control state for the prior period of time is thus stored in time/state memory 230 for all following times until the next entered desired state and time. Note that in this case a begin state bit is not stored in time/state memory 235. Thus the previously stored control state and time are errased and the control state reverts to that of the control state for the next prior time.

Figure 3:
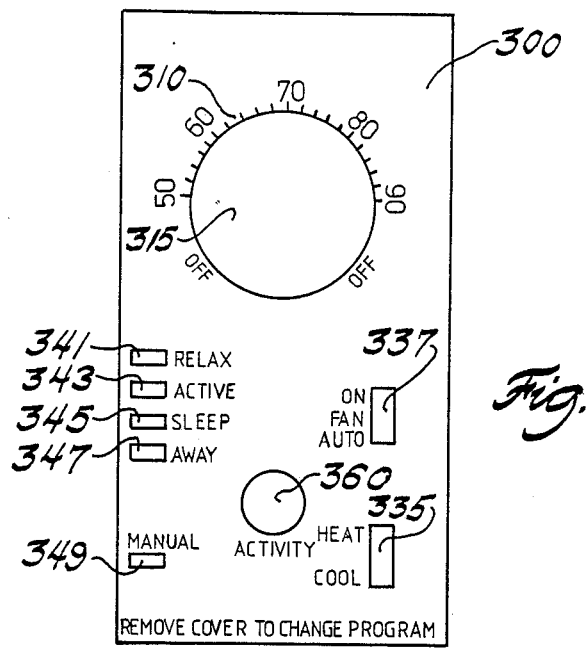
FIG. 3 illustrates the face plate of a door employed in the present invention.
Figure 4:
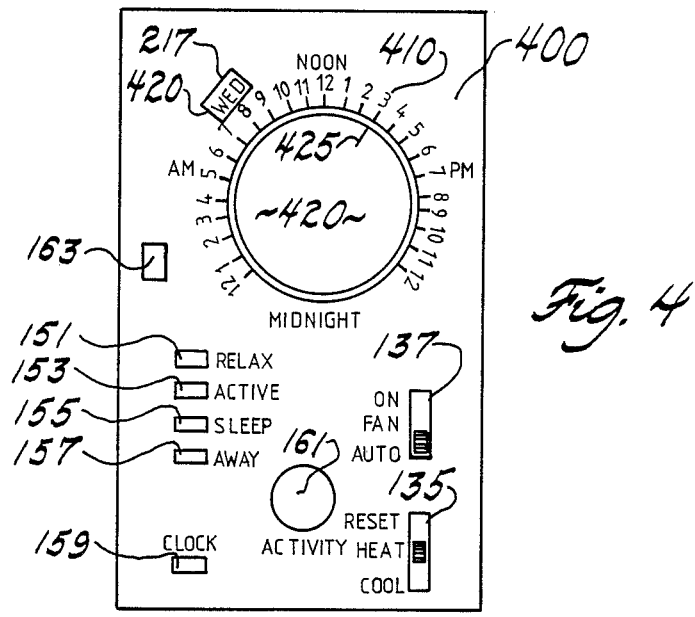
FIG. 4 illustrates the interior face plate employed in the present invention.

FIGS. 3 and 4 show the alternate indicia for the control of the apparatus of the present invention when the door cover is closed (FIG. 3) and when this door cover is open (FIG. 4). The door cover 300 illustrated in FIG. 3 is removable or rotatable out of position in order to reveal the face plate 400 which is hidden in normal operation.

FIG. 3 illustrates door cover 300 which holds indicia which corresponds to the major operational controls of the apparatus of the present invention. Door cover 300 includes a temperature indicia 310 which surrounds a opening 315. In operation a control knob for set point potentiometer 142 extends through opening 315 and door cover 300. As will be further illustrated in FIG. 4 this control knob has a mark which can be set a desired position opposite the temperature indicia 310. Door cover 300 further includes opening 337 opposite the fan switch 137 which has indicia corresponding to on and auto operation. Likewise, door cover 300 has opening 335 through which the operating lever of switch 135 protrudes. Note that only two selections (heat and cool) of the three possible selections of slide switch 135 are possible when the door cover 300 is in place. This is to prevent the operator from inadvertently requesting reset of the thermostat during normal operation. Door cover 330 also includes openings 341, 343, 345, 347 and 349 which are opposite the respective light emitting diodes 151, 153, 155, 157 and 159. The significance of these indicia will be further described below. Door cover 300 includes a further opening 360 through which the push-button of push-button switch 361 normally extends. Lastly, door cover 300 includes indicia 320 which indicates that removal of the cover is necessary in order to alter the program of the apparatus.

FIG. 4 illustrates face 400 of the apparatus which is employed below door cover 300 and is used when the thermostat is programmed. Face 400 includes time indicia 410 which surrounds the operator control knob 420 of set point potentiometer 142. This control knob includes mark 425. The operator can select a particular time by rotating control knob 420 until the mark 425 is opposite the desired time indicia 410. Notice that time indicia 410 runs from midnight through noon to midnight again. Note also that this indicia does not completely surround the knob 420. When the mark 425 is in the large midnight portion of indicia 410 wrap around detector 223 detects this position. If the knob is rotated so that mark 425 emerges on the opposite side from which it ended then a wrap around detector 223 activates either plus one circuit 224 or minus one circuit 225 in order to change the day stored in the day counter. At the same time the day of indicia 217 showing through window 420 is changed in the same direction by a cam coupled to the shaft of potentiometer 142.

FIG. 4 further illustrates light emitting diodes 151, 153, 155, 157 and 159 which are disposed in a line with respective indicia. FIG. 4 also illustrates slide switches 135 and 137 and push-button switch 161.

FIG. 4 further illustrates door switch 163. Door switch 163 is preferably a momentary contact push button switch. A peg (not illustrated) located on the back of door cover 300 is positioned to actuate switch 163 when door cover 300 is closed. When door cover 300 is not closed switch 163 is deactuated. This is a technique for sensing the state of door cover 300 well known in the art and need not be further described.

In accordance with the preferred embodiment of the present invention the data stored within time/state memory 230 is one of a plurality of states corresponding to a temperature offset. The relaxed state is a 0° offset. The active state is an offset of 2°, the sleep state is an offset of 5° and the away state is an offset of 10°. The particular location of the mark 425 of potentiometer 142 opposite the temperature indicia 310 of door cover 300 indicates the operator set point. The data stored within time/state memory 230 is the particular temperature offset for the particular day and time.

In operation the operator selects a desired set point by rotating knob 420 of potentiometer 142 until mark 425 is opposite the desired set point temperature indicated by temperature indicia 310. The program within time/state memory 230 then determines the actual temperature by summation of this offset for the particular time with the set point temperature.

The door cover 300 is removed in order to enter data into the time/state memory 230. The memory may be completely cleared along with clearing the day counter 226 and time counter 227 by moving switch 135 to the reset position. At this time the data output from analog to digital converter 210 corresponds to the time of time indicia 410 opposite mark 425 of knob 420. During reset this data is passed through AND gate 222 and serves to initialize time counter 227. Switch 135 is then switched out of the reset state.

The desired states are then entered into time/state memory 230 as follows: the mark 425 of knob 420 is rotated to be opposite the position of time indicia 410 corresponding to the next desired change in offset temperature. This causes analog to digital converter 210 to generate a digital signal corresponding to this time. Because the door is open AND gate 221 passes this time to the address input of time/state memory 230. At the same time AND gate 228 blocks the time output from time counter 227. The user then activates push-button 161. This causes state counter 233 to advance in state. At the same time this causes AND gate 231 to generate a write signal to time/state memory 230. With the address being selected by the day from day counter 226 and the time indicated via potentiometer 142 the current state of state counter 233 is stored within the appropriate address of time/state memory 230. At the same time this data is output to indicator LED's 235. Thus one of the light emitting diodes 151, 153, 155, or 157 is illuminated indicating the data which is output from state counter 233 and stored in time/state memory 230. When the light emitting diodes corresponding to the desired state is illuminated then the operator releases push-button 161. This serves to store this last state of state counter 233 into the specified memory location of time/state memory 230.

To program additional points the operator merely turns knob 420 of potentiometer 142 to the next desired time. If during this time the mark 425 turns forward from p.m. to a.m. then this causes the day wheel 215 to advance to allow the next day to be shown through opening 420. In addition, wrap around detector 223 causes add one circuit 225 to add one to day counter 226, also advancing day counter 226 to the next day. On the other hand, if the user turns mark 425 backwards past midnight from a.m. to p.m. then the cam causes day wheel 215 to rotate backwards allowing the previous day to be viewed through opening 420. At the same time wrap around detector 223 activates subtract one circuit 225 to cause the day stored within day counter 226 to be decremented. This serves to cause day counter 226 to also indicate the previous day. Because this day is a part of the address input of time/state memory 230, this causes the next state entered to be stored in a different location within time/state memory 230.

We claim:

1. A programmable control device comprising:

an operator adjustable rotary potentiometer having an adjustment knob with a mark thereon and an associated printed time indicia corresponding to twenty four hours of time disposed concentric with said adjustment knob, said rotary potentiometer being rotatable through 360° via said adjustment knob, said mark on said adjustment knob indicating a corresponding time on said time indicia, said rotary potentiometer having a pair of fixed terminals and a single rotary terminal, the resistance between said rotary terminal and one of said fixed terminals corresponding to the rotary position of said adjustment knob and thereby further corresponding to said time in said time indicia indicated by said mark;

a time signal means connected to said rotary potentiometer for generating a time signal indicative of a time corresponding to the resistance between said rotary terminal of said rotary potentiometer and one of said fixed terminals of said rotary potentiometer and thereby further corresponding to said time in said time indicia indicated by said mark;

a manual control state input means for selection of one of a plurality of control states;

a program memory means for storing therein a program of control states for particular times of a single 24 hours day;

a programming means connected to said time signal means, said manual control state input means and said program memory means for writing an indication of said selected control state in said program memory means at a location corresponding to said time signal;

a clock means for generating a clock signal indicative of the current time; and a control means connected to said program memory means and said clock means for recalling from said program memory means the control state corresponding to the current time indicated by said clock signal and for performing said recalled control function.

2. The programmable control device as claimed in claim 1, further comprising:

a program review means connected to said time signal means and said program memory means for recalling from said program memory means said control state corresponding to said time signal; and an indicator means connected to said program memory means for providing an operator perceivable indication of said recalled control state.

3. The programmable control device as claimed in claim 1, further comprising:

a mode selection switch connected to said time signal means, said program memory means and said clock means having a program mode and a control mode for recalling from said program memory means of said control state corresponding to said time signal when in program mode, and for recalling from said program memory means of said control state corresponding to said clock signal for application to said control means for performing said control function corresponding to said recalled control state when in control mode; and an indicator means connected to said program memory means for providing an operator perceivable indication of said recalled control state, thereby providing an indication of the control state stored in said program memory means for the time corresponding to the position of said adjustment knob of said rotary potentiometer when in said program mode and providing an indication of the control state being performed by said control means when in said control mode.

4. The programmable control device as claimed in claim 3, wherein
said mode selection means further includes means enabling said programming means to write into said program memory means only when in program mode.

5. The programmable control device as claimed in claim 1, further comprising:
a time set input means for generating a time set signal when actuated;
a time setting means connected to said time signal means, said clock means and said time set input means for setting the current time indicated by said clock signal to the time indicated by said time signal upon generation of said time set signal.

6. The programmable control device as claimed in claim 5, further comprising:
a memory clearing means connected to said program memory means and said time set input means for clearing said program of control states for particular times of a single 24 hour day stored in said program memory means upon generation of said time set signal.

7. The programmable control device as claimed in claim 1, wherein:
said clock means further includes a day counter for generating a day signal indicative of a particular day, said day counter being advanced to indicate the next day when the current time indicated by said clock signal passes midnight;
said program memory means is further connected to said day counter and further includes means for storing therein a plurality of control programs of control states for particular times of a single 24 hour day for differing days, said control state recalled from said program memory means being the control state corresponding to the current time indicated by said clock signal of the one of said plurality of control programs for particular times of a single 24 hour day corresponding to the particular day indicated by said day signal; and
said programmable control device further comprises a wrap around detector connected to said time signal means for incrementing the day indicated by said day signal if said time signal passes an indicated time of midnight in a forward direction and for decrementing the day indicated by said day signal if said time signal passes an indicated time of midnight in a backward direction.

8. The programmable control device as claimed in claim 7, wherein:
said wrap around detector detects a slow increase in resistance of said rotary potentiometer, followed by a rapid decrease in resistance as rotation past an indicated time of midnight in said forward direction, and detects a slow decrease in resistance of said rotary potentiometer followed by a rapid increase as rotation past an indicated time of midnight in said backward direction.

9. The programmable control device as claimed in claim 7, further comprising:
a day wheel mechanically connected to said rotary potentiometer having a plurality of day indicia and means for display of one of said day indicia, said day wheel advancing to display the next day indicia when said rotary potentiometer is rotated past said time indicia of midnight in said forward direction and retreating to display the previous day indicia when said rotary potentiometer is rotated past said time indicia of midnight in said backward direction.

10. The programmable control device as claimed in claim 1, wherein:
said program memory means stored an indication of the time of the beginning of a period of a new control state;
said programmable device further comprises begin state indicator means connected to said program memory means for generating an operator perceivable indication of when said time signal corresponds to said time of the beginning of a period of a new control state; and
said programmable device further comprises a manually actuable erase means connected to said program memory means for erasing said control state for the particular time indicated by said time signal when said begin state is indicated when actuated.

11. The programmable device as claimed in claim 10, wherein:
said manually actuable erase means is further connected to said manual control state input means and includes means for erasing said control state for said particular time indicated by said time signal when said begin state indicator indicates said particular time indicated by said time signal is the beginning of a period of a new control state upon manual selection of the control state of the previous time of the beginning of a period of a new control state by said manual control state input means.

12. A programmable thermostat for control of a temperature modifying apparatus comprising:
a mode selection means for selection of one of a program mode and a control mode;
an operator adjustable rotary potentiometer having an adjustment knob with a mark thereon, an associated printed time indicia corresponding to twenty four hours of time disposed concentric with said adjustment knob and a printed temperature indicia corresponding to temperature disposed concentric with said adjustment knob, said rotary potentiometer being rotatable through 360° via said adjustment knob, said mark on said adjustment knob indicating a corresponding time on said time indicia and a corresponding temperature on said temperature indicia, said rotary potentiometer having a pair of fixed terminals and a single rotary terminal, the resistance between said rotary terminal and one of said fixed terminals corresponding to the rotary position of said adjustment knob and thereby further corresponding to both said time in said time indicia indicated by said mark and said temperature in said temperature indicia indicated by said mark;
a time signal means connected to said rotary potentiometer for generating a time signal indicative of a time corresponding to the resistance between said rotary terminal of said rotary potentiometer and one of said fixed terminals of said rotary potentiometer and thereby further corresponding to said time in said time indicia indicated by said mark;

a manual control state input means for selection of a temperature offset;

a program memory means for storing therein a program of temperature offsets for particular times of a single 24 hour day;

a programming means connected to said mode selection means, said time signal means, said manual temperature offset input means and said program memory means for writing an indication of said selected temperature offset in said program memory means at a location corresponding to said time signal when in program mode;

a clock means for generating a clock signal indicative of the current time;

a set point temperature signal means connected to said rotary potentiometer for generating a set point temperature indicative of a temperature corresponding to the resistance between said rotary terminal of said rotary potentiometer and said one of said fixed terminals of said rotary potentiometer and thereby further corresponding to said temperature in said temperature indicia indicated by said mark; and a control means connected to said mode selection means said program memory means, said clock means and said set point temperature signal means for recalling from said program memory means the temperature offset corresponding to the current time indicated by said clock signal and for thermostatic control of the temperature modifying apparatus for maintaining a temperature equal to the sum of the set point temperature indicated by said set point temperature signal and said recalled temperature offset when in control mode.

13. The programmable thermostat as claimed in claim 12, further comprising:

an indicator means connected to said program memory means for providing an operator perceivable indication of said recalled temperature offset, thereby providing an indication of the temperature offset stored in said program memory means for the time corresponding to the position of said adjustment knob of said rotary potentiometer when in said program mode and providing an indication of the temperature offset of the thermostatic control performed by said control means when in said control mode.

14. The programmable thermostat as claimed in 12, further comprising:

a time set input means for generating a time set signal when actuated;

a time setting means connected to said time signal means, said clock means and said time set input means for setting the current time indicated by said clock signal to the time indicated by said time signal upon generation of said time set signal.

15. The programmable thermostat as claimed in claim 14, further comprising:

a memory clearing means connected to said program memory means and said time set input means for clearing said program of temperature offsets for particular times of a single 24 hour day stored in said program memory means upon generation of said time set signal.

16. The programmable thermostat as claimed in claim 12, wherein:

said clock means further includes a day counter for generating a day signal indicative of a particular day, said day counter being advanced to indicate the next day when the current time indicated by said clock signal passes midnight;

said program memory means is further connected to said day counter and further includes means for storing therein a plurality of control programs of control states for particular times of a single 24 hour day for differing days, said temperature offset recalled from said program memory means being the control state corresponding to the current time indicated by said clock signal of the one of said plurality of control programs for particular times of a single 24 hour day corresponding to the particular day indicated by said day signal; and said programmable control device further comprises a wrap around detector connected to said time signal means for incrementing the day indicated by said day signal if said time signal passes an indicated time of midnight in a forward direction and for decrementing the day indicated by said day signal if said time signal passes an indicated time of midnight in a backward direction.

17. The programmable control device as claimed in claim 16, further comprising:

a day wheel mechanically connected to said rotary potentiometer having a plurality of say indicia and means for display of one of said day indicia, said day wheel advancing to display the next day indicia when said rotary potentiometer is rotated past said time indicia of midnight in said forward direction and retreating to display and the previous day indicia when said rotary potentiometer is rotated past said time indicia of midnight in said backward direction.

18. The programmable thermostat as claimed in claim 16, wherein:

said wrap around detector detects a slow increase in resistance of said rotary potentiometer, followed by a rapid decrease in resistance as rotation past an indicated time of midnight in said forward direction, and detects a slow decrease in resistance of said rotary potentiometer followed by a rapid increase as rotation past an indicated time of midnight in said backward direction.

19. The programmable thermostat as claimed in claim 12, wherein:

said program memory means stores an indication of the time of the beginning of a period of a new temperature offset;

said programmable device further comprises begin state indicator means connected to said program memory means for generating an operator perceivable indication of when said time signal corresponds to said time of the beginning of a period of a new temperature offset; and said programmable device further comprises a manually actuable erase means connected to said program memory means for erasing said temperature offset for the particular time indicated by said time signal when said begin state is indicated when actuated.

20. The programmable thermostat as claimed in 19, wherein:

said manually actuable erase means is further connected to said manual temperature offset input means and includes means for erasing said temperature offset for said particular time indicated by said time signal when said begin state indicator indicates said particular time indicated by said time signal is the beginning of a period of a new temperature offset upon manual selection of the temperature offset of the previous time of the beginning of a period of a new temperature offset by said manual temperature offset input means.

21. The programmable thermostat as claimed in claim 12, wherein:
said programmable thermostat further comprises a door having an open and a closed state and an opening for passing said adjustment knob therethrough when in said closed state;
said temperature indicia consisting of a printed indicia on said door disposed around said opening; and
said mode selection means consists of a door switch connected to said door for selecting said program mode when said door is in said open state and for selecting said control mode when said door is not in said open state, whereby said mark on said adjustment knob indicates time on said time indicia for entry of particular times of a 24 hour day during entry of a control program when said door is open and said program mode is selected and said mark on said adjustment knob indicates temperature on said temperature indicia for entry of a set point temperature when said door is closed and said control mode is selected.

* * * * *